United States Patent
Kirchberger et al.

(10) Patent No.: US 6,300,257 B1
(45) Date of Patent: Oct. 9, 2001

(54) EXTRUSION-COATED NONWOVEN SHEETING

(75) Inventors: Manfred Kirchberger, Prambachkirchen; Anton Wolfsberger, Engerwitzdorf; Christian Paulik, Linz, all of (AT)

(73) Assignee: Borealis AG, Schwechat-Mannswoerth (AT)

( * ) Notice: Subject to any disclaimer, the term of this patent is extended or adjusted under 35 U.S.C. 154(b) by 0 days.

(21) Appl. No.: 09/382,836

(22) Filed: Aug. 25, 1999

(30) Foreign Application Priority Data

Aug. 25, 1998  (DE) .............................. 198 38 507

(51) Int. Cl.$^7$ .............................. B32B 27/04; B32B 5/18; B32B 27/12
(52) U.S. Cl. .................. 442/77; 442/62; 442/76; 442/110
(58) Field of Search .................. 442/76, 62, 77, 442/110

(56) References Cited

U.S. PATENT DOCUMENTS 5,955,187 * 9/1999 McCormack et al. ............ 428/315.5

* cited by examiner

Primary Examiner—Blaine Copenheaver
Assistant Examiner—Christopher C. Pratt
(74) Attorney, Agent, or Firm—Jordan and Hamburg LLP

(57) ABSTRACT

A nonwoven layer of sheeting is extrusion-coated on one side with ethylene polymers, propylene polymers, modified propylene polymers and fillers. The nonwoven layer of sheeting is formed from polyethylene, polypropylene, polyethylene terephthalate and/or polyamide. The coated nonwoven sheeting is subjected to longitudinal and transverse stretching and white crackling cloudiness develops. The extrusion-coated nonwoven sheeting has a textile texture and is suitable for use in hygiene products, in medical products, in the textile and clothing industry, in the automobile industry and in construction products.

10 Claims, 1 Drawing Sheet

Frame width 57.3μm

EXTRUSION-COATED NONWOVEN SHEETING

Figure 1:
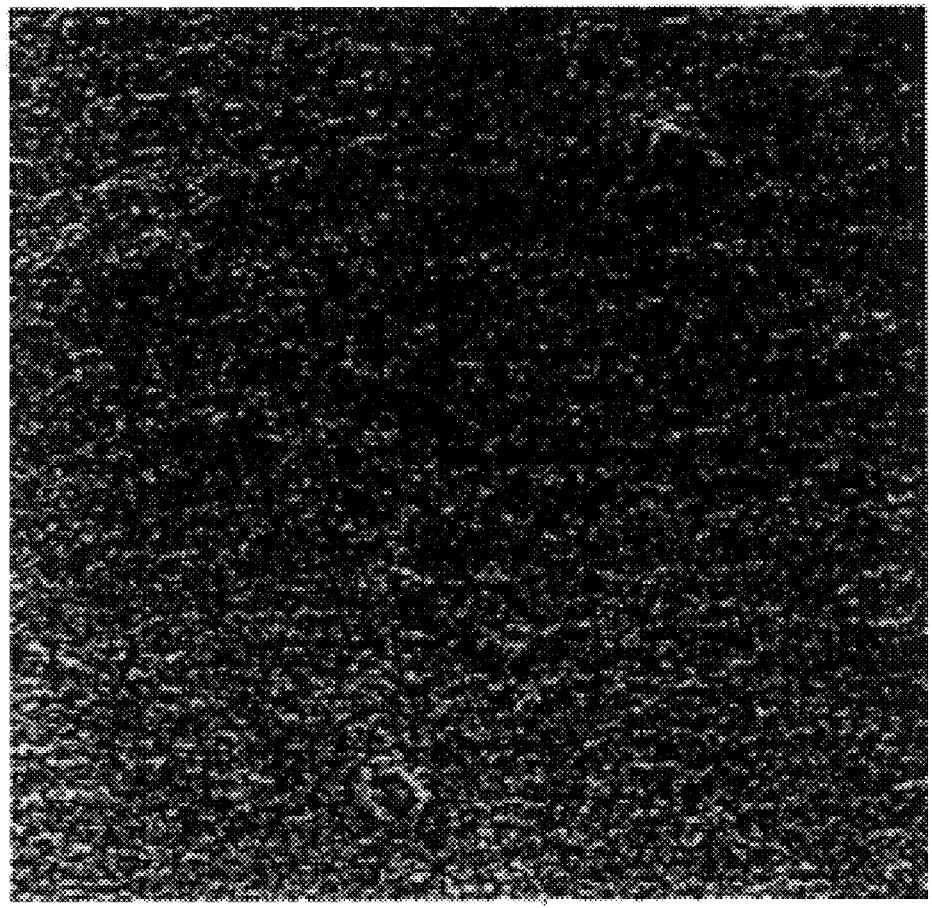

The invention relates to extrusion-coated nonwoven sheeting of polyethylene, polypropylene, polyethylene terephthalate or polyamide, which is coated on one side with polyolefins, has a textile character and is suitable for use in the hygiene area, in the medicine area, in the textile and clothing industry, in the automobile industry as well as in construction.

The manufacture of nonwoven sheeting in the form of plastic nonwovens by the staple fiber technology, by the spunbonded technology and by the melt-blow technology (Fourne, F., Chemiefasern/Textilindustrie 81 (1979), 445–449; 95 (1993), 811–822; DE 195 21 466; DE 19 620 379), as well as by the afterstretching of plastic nonwoven (DE 195 01 123; DE 195 01 125) is known.

Laminating, thermal bonding, ultrasonic welding and extrusion coating are the usual methods for applying coatings on plastic nonwovens.

Known examples of plastic nonwovens, which were produced by laminating plastic film on plastic nonwovens, are polyethylene-coated polypropylene nonwovens (French patent 2,729,328), PVC-coated polyester nonwovens (U.S. Pat. No. 4,591,526) and polypropylene-coated nonwoven materials (U.S. Pat. No. 5,169,712).

Known examples of coated plastic nonwovens, which were produced by thermal bonding, are polyethylene-coated polypropylene nonwovens (German patent 3,515,580) and polypropylene-coated plastic nonwovens (WO 95/11803; German patent 19 534 704; German patent 19 534 702).

Known examples of coated plastic nonwovens, which were produced by ultrasonic welding of film to nonwoven material, are polyethylene-coated polyethylene nonwovens (European patent 0 325 543) and film-coatings of polypropylene and textile fabrics (European patent 0 505 027).

Known examples of extrusion-coated plastic nonwovens are acrylate-coated polyethylene terephthalate nonwovens (French patent 2,662,603), polyethylene-coated polypropylene nonwovens (SU 1,514,653; European patent 0 474 123) and EVA-coated to polyethylene nonwovens (European patent 0 291 598).

Known bonding agents for bonding agent intermediate layers to improve adhesion of the polyolefins coating on the textile fabrics are acid-grafted or acid anhydride-grafted polypropylenes, ethylene (meth)acrylate copolymers, EVA copolymers, polyisocyanates or polyurethanes (Japanese patents 52094383 and 60250938).

Finally, the manufacture of films with a high porosity, by stretching polyolefins films, which contain large proportions of fillers, is also known (European patents 0 352 802 and 0 779 325) is also known.

The disadvantage of the known solutions for nonwoven sheeting with porous polyolefin coating consists therein that nonwoven sheeting with thin polyolefin coatings, which meet the requirements of coating thickness, number of pores and pore size distribution, cannot be produced by known technologies.

It is an object of the present invention to develop nonwoven sheeting with a thin polyolefin coating, which has a large number of pores with a very small pore diameter and are suitable for use in the hygiene area, in the area of medicine, in the textile and clothing industry, in the automobile industry as well as in construction.

The inventive objective was accomplished by nonwoven sheeting with a textile character, extrusion coated on one side with polyolefins and having a tensile strength of 4 to 20 MPa in the longitudinal direction and 2 to 15 MPa in the transverse direction and a total weight per unit area of 10 to 100 g/m$^2$, the extrusion coatings of polyolefins having a weight per unit area of 5 to 70 g/m$^2$ and preferably of 6 to 40 g/m$^2$, a white crackling cloudiness of 0.1 to 5 percent and preferably of 0.1 to 2 percent, a pore area distribution, for which at least 90 percent of all pores ranging in area from 0.03 to 0.20 µm$^2$ and the maximum pore area is less than 1 µm, and the nonwoven sheeting consisting of polyethylene and/or polypropylene and/or polyethylene terephthalate and/or polyamide and having a weight per unit area of 5 to 100 g/m$^2$ and preferably of 10 to 40 g/m$^2$, the extrusion coatings, pursuant to the invention, consisting of polyolefins of a) ethylene homopolymers or copolymers of 70 to 99 percent by weight of ethylene and 30 to 1 percent by weight of α-olefins with 4 to 18 carbon atoms and/or vinyl acetate and/or aliphatic $C_1$ to $C_4$ alkyl (meth) acrylates with melt indexes of 0.1 to 100 g/10 minutes at 190° C./2.16 kg and/or b) propylene homopolymers or copolymers of 70 to 99 percent by weight of propylene and 30 to 1 percent by weight of ethylene and/or α-olefins with 4 to 18 carbon atoms, c) optionally 1 to 50 percent by weight and preferably 5 to 30 percent by weight, based on the propylene polymers b), of modified propylene polymers with melt indexes of 0.1 to 50 g/10 minutes at 230° C./2.16 kg and preferably of 1 to 40 g/10 minutes at 230° C./2.16 kg and a ratio of the intrinsic viscosity of the modified polypropylene to the intrinsic viscosity of the unmodified polypropylene with largely the same weight average molecular weight of 0.20 to 0.95, d) 10 to 60 percent by weight, based on the sum of the polyolefins, of organic and/or inorganic fillers with a particle diameter, measured over the longest extent of the particles, of 0.1 to 10 µm and preferably of 0.5 to 5 µm, and e) 0.01 to 2.5 percent by weight of stabilizers, 0.01 to 1 percent by weight of processing aids, in each case based on the sum of the polyolefins, and optionally 0.1 to 1 percent by weight of antistats and/or 0.05 to 1 percent by weight of nucleating agents, in each case based on the sum of the polyolefins, as auxiliary materials, and in which the nonwoven sheeting, extrusion-coated with polyolefins, is produced pursuant to the invention by a method, for which the nonwoven sheeting, with a weight per unit area of 10 to 70 g/m$^2$ and preferably of 20 to 40 g/m$^2$, is extrusion coated with the aforementioned mixtures of polyolefins and 10 to 60 percent by weight, based on the sum of the polyolefins, of organic and/or inorganic fillers, the residual moisture content of the mixtures preferably being less than 600 ppm, from the melt at mass temperatures of 170° to 290° C. and at an equipment speed of 50 to 300 m/min and preferably of 150 to 250 m/min, and the coated nonwoven sheeting is subjected at temperatures of 60° to 0° C. below the crystallization temperature of the extrusion coatings of polyolefins to longitudinal stretching of 1:1.1 to 1:6 and preferably of 1:1.1 to 1:2 and subsequently, at temperatures of 80° to 1° C. and preferably of 60° to 2° C. below the melting temperature of the extrusion coatings of polyolefins, to a transverse stretching of 1:1.1 to 1:6 and preferably of 1:1.1 to 1:2, the white crackling cloudiness being achieved by the stretching, particularly by the longitudinal stretching.

The ethylene homopolymers or ethylene copolymers, optionally contained in the extrusion coatings of the inventive, extrusion-coated nonwoven sheeting, preferably are polyethylenes with densities ranging from 0.90 to 0.94 g/cc, which have been synthesized using highly active Ziegler-Natta catalysts or metallocene catalysts.

Copolymers of ethylene and vinyl acetate and/or aliphatic $C_1$ to $C_4$ alkyl (meth)acrylates are contained in the extrusion coatings of the inventive, extrusion-coated nonwoven sheeting preferably if the nonwoven sheeting contains polyamide and/or polyethylene terephthalate fibers and the extrusion coating is applied as a co-extrusion coating for improving the interlaminar bonding strength, the co-extrusion layer, facing the nonwoven sheeting, containing the ethylene copolymers.

The polypropylene homopolymers or polypropylene copolymers, optionally contained in the extrusion coatings of the inventive, extrusion-coated nonwoven sheeting, preferably are propylene homopolymers and/or copolymers, synthesized using Ziegler-Natta catalysts or metallocene catalysts from propylene, ethylene and/or α-olefins with 4 to 18 carbon atoms with a propylene content of 75.0 to 99.9 percent by weight in the form of the random copolymers, block copolymers and/or random block copolymers with melt indexes of 0.1 to 300 g/10 minutes at 230° C./2.16 kg and preferably of 1 to 150 g/10 minutes at 230° C./2.16 kg. Particularly suitable are propylene homopolymers with a bimodal molecular weight distribution, a weight average molecular weight $M_w$ of 50,000 to 1,500,000 g/mole, a number average director weight $M_n$ of 25,000 to 100,000 g/mole and $M_w/M_n$ values of 2 to 60, which were synthesized in a reactor cascade.

Furthermore, the propylene homopolymers or propylene copolymers, optionally contained in the extrusion coatings of the inventive, extrusion-coated nonwoven sheeting, consist particularly of a polyolefins mixture with an $M_w/M_n$ ratio of 2 to 6 and a melt index of 1 to 40 g/10 minutes at 230° C./2.16 kg, which is, composed of 60 to 98 percent by weight of a crystalline copolymer of 85 to 99.5 percent by weight of propylene and 15 to 0.5 percent by weight of ethylene and/or an α-olefin of the general formula $CH_2=CHR$, in which R is a linear or branched alkyl group with 2 to 8 carbon atoms, and 2 to 40 percent by weight of an elastic copolymer of 20 to 70 percent by weight of ethylene and 80 to 30 percent by weight of propylene and/or an α-olefin of the general formula $CH_2=CHR$, in which R is a linear or branched alkyl group with 2 to 8 carbon atoms.

The polymer mixtures, described in the EP 400 333 or EP 472 946 are examples of the polyolefins mixtures of crystalline copolymers and elastic copolymers.

The propylene homopolymers or propylene copolymers, contained in the extrusion coatings of the inventive, extrusion-coated nonwoven sheeting, can also, in particular, be largely amorphous polypropylenes and/or propylene copolymers, which contain less than 10 percent by weight of crystalline polypropylene or crystalline propylene copolymer, have an enthalpy of melting of less than 40 J/g and a melt index of 0.1 to 100 g/10 minutes at 230° C./2.16 kg, the largely amorphous polypropylene being a homopolymer of propylene and/or a copolymer of propylene of at least 80 mole percent of propylene and not more than 20 mole percent of one or more α-olefins of the general formula $CH_2=CHR$, in which R is a linear or branched alkyl group with 2 to 8 carbon atoms.

These largely amorphous polypropylenes or propylene copolymers, in particular, are stereo block polypropylenes, which are synthesized, for example, using highly active metal oxide-fixed Ziegler-Natta catalysts (Collette, J., Macromolecules 22 (1989), 3851–3858; DE 2830160) or soluble Ziegler-Natta catalysts (de Candia, F., Makromol Chem. 189 (1988), 815–821), which optionally are synthesized with subsequent reactive modification (EP 636863) and/or degradation (EP 640 850).

Finally, the propylene homopolymers or propylene copolymers, optionally contained in the extrusion coatings of the inventive, extrusion-coated nonwoven sheeting, preferably are non-isotactic propylene homopolymers with a melting point of 145° to 165° C., a melt viscosity greater than 200,000 cps at 190° C., a heat of crystallization of 4 to 10 cal/g and a solubility in diethyl ether of 35 percent by weight to 55 percent by weight. Examples of the non-isotactic propylene homopolymers are the products described in EP 475 307 or EP 475 308.

The modified propylene polymers c), which optionally are contained in the extrusion coatings of the inventive, extrusion coated nonwoven sheeting, preferably are modified propylene polymers, which were synthesized by treating propylene homopolymers and/or copolymers of propylene and ethylene or α-olefins with 4 to 18 carbon atoms, as well as by treating mixtures of said polypropylenes with multifunctional, ethylenically unsaturated monomers and/or with ionizing radiation or thermally decomposing free radical-forming agents.

Examples of these modified propylene polymers c), prepared by treating polypropylenes with multifunctional, ethylenically unsaturated monomers and/or ionizing radiation or thermally decomposing free radical-forming agents are, in particular:

modified polypropylenes by reacting polypropylenes with bis-maleimido compounds in the melt (EP 574 801; EP 574 804), modified polypropylenes by treating polypropylenes with ionizing radiation in the solid phrase (EP 190889; EP 634454), modified polypropylenes by treating polypropylenes with peroxides in the solid phase (EP 384431; DE 4340194) or in the melt (EP 142 724), modified polypropylenes by treating polypropylenes with multifunctional, ethylenically unsaturated monomers under the action of ionizing radiation (EP 678527), modified polypropylenes by treating polypropylenes with multifunctional ethylenically unsaturated monomers in the presence of peroxides in the melt (EP 688817; EP 450342).

A preferred variation of modified propylene polymers c), which were synthesized by treating propylene homopolymers and/or copolymers of propylene and ethylene or α-olefins with a 4 to 18 carbon atoms as well as mixtures of said polypropylenes with multifunctional, ethylenically unsaturated monomers and thermally decomposing free radical-forming agents, are modified propylene polymers c), which have been synthesized by a continuous method, in which 1) polypropylene particles in the form of powders, granulates or grit, with a preferred particle size ranging from 0.001 to 7 mm, which consist of 1.1) propylene homopolymers, particularly propylene homopolymers with a bimodal molecular weight distribution, a weight average molecular weight $M_w$ of 500,000 to 1,500,000 g/mole, a number average molecular weight $M_N$ of 25,000 to 100,000 g/mole and $M_w/M_n$ values of 5 to 60, which were synthesized in a reactor cascade using Ziegler-Natta catalysts or metallocene catalysts, and/or of 1.2) copolymers of propylene and ethylene or α-olefins with 4 to 18 carbon atoms, preferably random propylene copolymers, propylene block copolymers, random propylene block copolymers and/or elastomeric polypropylenes or of mixtures of said modified polypropylenes, are mixed in a continuous mixer with 0.05 to 3 percent by weight, based on the polypropylenes used, of acyl peroxides, alkyl peroxides, hydroperoxides, peroxycarbonate and/or peresters as thermally decomposing free radical-forming agents, the thermal decomposition of which is concluded preferably below 210° C. and which optionally are diluted with inert solvents, with heating to 30° to 100° C. and preferably to 70° to 90° C.

2) readily volatile, bifunctional monomers, particularly $C_4$ to $C_{10}$ dienes and/or $C_7$ to $C_{10}$ divinyl compounds, are adsorbed by the polypropylene particles from the gas phase, preferably in continuous flow mixers as continuous gas-solid adsorbers, at a temperature T of 20° C. to 120° C. and preferably of 60° to 100° C. and an average absorption time of 10 seconds to 1,000 seconds and preferably of 60 seconds to 600 seconds, the proportion of bifunctional, unsaturated monomers in the polypropylene particles being 0.01 to 10 percent by weight and preferably 0.05 to 2 percent by weight, based on the polypropylenes used, subsequently 3) the polypropylene particles, in which the acyl peroxides, alkyl peroxides, hydroperoxides, peroxycarbonates and peresters, as thermally decomposing free radical-forming agents, and the bifunctional, unsaturated monomers have been adsorbed, are melted under an atmosphere of an inert gas and of these readily volatile bifunctional monomers at 110° to 210° C. in continuously operating kneaders or extruders, preferably in twin screw extruders and, at the same time, the thermally decomposing free radical-forming agents are decomposed, 4) the melt thereupon is heated to 220° C. to 300° C., unreacted monomers and decomposition products being removed and 5) the melt is granulated in a known manner, and for which, before steps 1) and/or 5) of the method and/or before or during step 3) and/or 4) of the method, 0.01 to 2.5 percent by weight of stabilizers, 0.1 to 1 percent by weight of antistats, 0.05 to 1 percent by weight of nucleating agents and/or 0.01 to 5 percent by weight of processing aids, based on the polypropylene used, are added as further processing aids.

As modified polypropylene polymers c), which are optionally contained in the extrusion coatings of the inventive, extrusion-coated nonwoven sheeting, propylene polymers are preferred, which are also modified and produced by the reaction of functionalized polypropylenes, preferably polypropylenes containing acid and/or acid anhydride groups, with multifunctional compounds of opposite reactivity, preferably with $C_2$ to $C_{16}$ diamines and/or $C_2$ to $C_{16}$ diols.

Examples of modified propylene polymers c), produced by polymer-like reactions, are, in particular:

modified polypropylenes obtained by reacting maleic anhydride-grafted polypropylene with diamines or polyglycols (EP 177401; JP 08 176 365), modified polypropylenes, obtained by reacting polypropylenes, containing acid or acid anhydride groups, with polymers containing epoxy, hydroxy or amino groups (EP 307684; EP 299486).

Furthermore, as modified propylene polymers c), which optionally are contained in the extrusion coatings of the inventive, extrusion-coated nonwoven sheeting, modified propylene polymers are preferred, which are produced by the hydrolytic condensation of polypropylenes, which contain hydrolyzable silane groups. The products, described in the DE 4107635 or U.S. Pat. No. 4,714,716 are examples.

The special advantage of using the modified propylene polymers c) for the production of the inventive, extrusion-coated nonwoven sheeting with coating formulations, containing propylene polymers and fillers, lies in the increased equipment speed and in the possibility of producing extrusion-coated nonwoven sheeting with significantly thinner coatings, which leads to appreciable advantages in relation to the properties of the composite.

In the extrusion coatings of the inventive, extrusion-coated nonwoven sheeting, 0.01 to 2.5 percent by weight of stabilizers, 0.01 to 1 percent by weight of processing aids, in each case based on the least some of the polyolefins, and optionally 0.1 to 1 percent by weight of antistats and/or 0.05 to 1 percent by weight of nucleating agent, in each case based on the sum of the polyolefins, furthermore are contained.

The stabilizers, contained in the extrusion coatings of the inventive, extrusion-coated nonwoven sheeting, preferably are mixtures of 0.01 to 0.6 percent by weight of phenolic antioxidants, 0.01 to 0.6 percent by weight of 3-arylbenzofuranones, 0.01 to 0.6 percent by weight of processing stabilizers based on phosphites, 0.01 to 0.6 percent by weight of high temperature stabilizers based on disulfides and thioethers and/or 0.01 to 0.8 percent by weight of sterically hindered amines (HALS).

Suitable phenolic antioxidants are 2-t-butyl-4,6-dimethylphenol,2,6-di-t-butyl-4-methylphenol,2,6-di-t-butyl-4-isoamylphenol, 2,6-di-t-butyl-4-ethylphenol,2-t-butyl-4,6-diisopropylphenol, 2,6-dicyclopentyl-4-methylphenol, 2,6-di-t-butyl-4-methoxymethylphenol,2-t-butyl-4,6-dioctadecylphenol,2,5-di-t-butylhydroquinone,2, 6-di-t-butyl-4,4-hexadecyloxyphenol,2,2'-methylene-bis(6-t-butyl-4-methylphenol),4,4'-thio-bis-(6-t-butyl-2-methylphenol), octadecyl 3(3,5-di-t-butyl-4-hydroxyphenyl-propionate, 1,3,5-trimethyl-2,4,6-tris(3',5'-di-t-butyl-4-hydroxybenzyl)benzene and/or pentaerythritol tetrakis(3-(3,5-di-t-butyl-4-hydroxyphenyl) propionate.

As benzofuranone derivative, particularly 5,7-di-t-butyl-3-(3,4-di-methylphenyl)-3H-beonzofuran-2-one is suitable.

As HALS compounds, bis-2,2,6,6-tetramethyl-4-piperidyl sebacate and/or poly((1,1,3,3-tetramethylbutyl)-imino)-1,3,5-triazine-2,4,diyl)(2,2,6,6-tetramethylpiperidyl)-amino)-hexamethylene-4-(2,2,6,6-tetramethyl)piperidyl)-imino) are particularly suitable.

The nucleating agents, optionally contained in the extrusion coatings of the inventive, extrusion-coated nonwoven sheeting, preferably are α-nucleating agents such as talcum, sorbitol and sorbitol derivatives, sodium benzoate or the sodium salt of methylene-bis(2,4-di-t-butylphenol)-phosphoric acid or β-nucleating agents, such as adipic acid, adipic acid dianilide, quinacridone quinone, salts of dicarboxylic acids, such as calcium palmitate, and/or N,N'-dicyclododecyl-4,4-biphenyldicarboxamide.

As fillers, the extrusion coatings of the inventive extrusion-coated nonwoven sheeting contain, in particular, fillers with an average particle size of 0.5 to 2 μm.

The inorganic fillers in the extrusion coatings of the inventive, extrusion-coated nonwoven sheeting preferably are calcium carbonates.

The residual moisture content of the polyolefin mixtures for the extrusion coatings immediately before the coating is produced preferably is less than 300 ppm and, particularly, less than 100 ppm.

For the production of the extrusion-coated nonwoven sheeting, nonwoven sheeting, in particular, is used, which was produced by the spunbonding technology.

The inventive, extrusion-coated nonwoven sheeting is suitable preferably for use in the sectors of packaging, especially for breathable packaging for food, detergents and drugs, for the textile and clothing industry, especially for breathable, industrial protective clothing, for sports and a military clothing, interlinings and decorative covering nonwovens, the hygiene industry, especially for breathable baby diapers, incontinence products, panty inserts and sanitary napkins, medicine, especially for breathable operating room clothing, clothing to protect against infection, table and bed covers, in construction, especially for breathable dividing nonwovens and roof linings, in vehicle, equipment and machinery construction, in electrotechnology, electronics and packaging for transport, in domestic appliances, as well as for office and organizational requirements.

The invention is explained by the following examples.

EXAMPLE 1

1.1 Synthesis of the Modified Propylene Polymers C)

To a continuous mixer, which can be heated, a powdery polypropylene homopolymers, with a melt index of 3.2 g/10 minutes at 230° C./2.16 kg and an average particular diameter of 0.25 mm), is added continuously. Furthermore, 0.1 percent by weight of calcium stearate and 0.06 percent by a weight of bis(t-butyl-peroxy)-2,5-dimethylhexane, in each case based on the polypropylene homopolymer, are added continuously. While being mixed homogeneously at 45° C., the polypropylene homopolymer, charged with the thermally decomposing free radical-forming agent and auxiliary material, adsorb 0.07 percent by weight of butadiene, based on the polypropylene homopolymer, from a butadiene-nitrogen mixture at 45° C. during a residence time of 4.5 minutes. After being transferred to a twin-screw extruder, the powdery reaction mixture, in contact with the added butadiene-nitrogen mixture and with, the addition of 0.1 percent by weight of tetrakis(methylene(3,5-di-t-butylhydroxycinnamate)methane and 0.1 percent by weight of tris(2,4-di-t-butylphenyl)phosphite, is melted at a mass temperature of 230° C. and, after a rough degassing, subjected to a fine degassing, during which water is added as entraining agent, discharged and granulated.

The resulting modified polypropylene contains 0.05 percent by weight of bound butadiene, as determined by IR spectroscopy and has a melt index of 4.9 g/10 minutes at 230° C./2.16 kg and a crystallization point (DSC) of 126.8° C.

1.2 Preparation of the Polypropylene Mixture

A mixture of
10 percent by weight of a modified propylene polymer, containing 0.05 percent by weight of bound butadiene and having a melt index of 4.9 g/10 minutes at 230° C./2.16 kg and a crystallization point (DSC) of 126.8° C.

50 percent by weight of a heterophasic polypropylene mixture of a crystalline propylene ethylene copolymer, with a melt index of 19.8 g/10 minutes at 230° C./2.16 kg and an $M_w/M_N$ ratio of 3.7, 40 percent by weight of a coated chalk with a particle diameter, measured over the longest extent of the particles, of 1 $\mu$m, is melted in a Werner & Pfleiderer ZSK 92 twin screw extruder with a temperature profile of 120°/150°/190°/210°/240°/210°/210°/200° C., homogenized, discharged and granulated.

The resulting polypropylene compound has a melt index of 8.4 g/10 minutes at 230° C./2.16 kg and a density of 1.28 g/cc at 23° C.

1.3 Preparation of the Composite with a Textile Character

On a cast coating installation (diameter: 120 mm, 33 D), consisting of a plasticizing extruder with a sheet die, the compound is pre-dried for three hours at 80° C. to a residual moisture content of 80 ppm and melted in the extruder at a temperature profile of 180°/180°/145°/145°/200°/210°/220°/220°/220°/220°/220°/220°/220°/220° C. and the melt is extruded through the sheet die at a die temperature of 220° C. directly onto a polypropylene spunbonded material, which is supplied and has a weight per unit area of 30 g/m$^2$,
a longitudinal tensile strength of 8.2 MPa
a transverse tensile strength of 4.5 MPa
a longitudinal tensile elongation of 108.7 percent
a transverse tensile irrigation of 94.5 percent
a longitudinal resistance to tearing of 6.6 MPa
a transverse resistance to tearing of 3.0 MPa
a longitudinal elongation at tear of 113.1 percent
a transverse elongation at tear of 99.5 percent
at an equipment speed of 170 m/min.

After the melt is fixed on the nonwoven, the total composite, while being taken off, is cooled to a temperature range below the crystallization range of the polypropylene mixture, edge trimmed and rolled up. This composite, which has not been stretched, has the following properties:

a total weight per unit area of 60 g/m$^2$
a longitudinal tensile strength of 6.01 MPa
a transverse tensile strength of 2.6 MPa
a longitudinal tensile elongation of 103.3 percent
a transverse tensile irrigation of 44.6 percent
a longitudinal resistance to tearing of 4.55 MPa
a transverse resistance to tearing of 1.49 MPa
a longitudinal elongation at tear of 106.5 percent
a transverse elongation at tear of 61.6 percent.

Subsequently, the composite is stretched longitudinally at a stretching ratio of 1:1.7 and at temperatures ranging from 40° to 120° C. and transversely at a stretching ratio of 1:1.5 and at temperatures ranging from 100° to 140° C.

The white crackling cloudiness becomes pronounced especially during the longitudinal stretching but also during the transverse stretching.

The biaxially stretched composite with a textile character has the following properties:

a total weight per unit area of 28 g/m$^2$
a longitudinal tensile strength of 8.9 MPa
a transverse tensile strength of 5.9 MPa a longitudinal tensile elongation of 23.2 percent a transverse tensile irrigation of 16 percent a longitudinal resistance to tearing of 6.26 MPa a transverse resistance to tearing of 4.68 MPa a longitudinal elongation at tear of 28.2 percent a transverse elongation at tear of 18.6 percent.

pore area: 95 percent of all pores have an area $\leq 0.18\,\mu m$ largest pore measured has a pore area of 0.64 $\mu m^2$ pore size distribution: 96.3 percent of all pores have an area, which falls within the range of 0.03 to 0.20 $\mu m^2$.

The SEM photograph of FIG. 1 characterizes the structure of the composite.

EXAMPLE 2

2.1 Preparation of the Polypropylene Mixture

A mixture of 20 percent by weight of a modified polypropylene polymer, with a melt index of 10.8 g/10 minutes at 230° C./2.16 kg and a crystallization point (DSC) of 125.3° C.

50 percent of a CR-PP polypropylene homopolymer, with a melt index of 25.8 g/10 minutes at 230° C./2.16 kg and an $M_w/M_N$ ratio of 2.8 and 30 percent by weight of a compacted talcum with a particle diameter, measured over the longest extent of the particles, of 3 $\mu m$, is melted in a Werner & Pfleiderer twin screw extruder ZSK 133 with a temperature profile of 150°/180°/200°/220°/250°/220°/220°/210° C., homogenized, discharged and granulated.

The resulting polypropylene compound has a melt index of 14.4 g/10 minutes at 230° C./2.16 kg and a density of 1.15 g/cc.

2.2 Preparation of the Composite with a Textile Character

After it is pre-dried at 150° C. for 4 hours, the compound has a residual moisture content of 250 ppm.

On a coating installation (diameter: 150 mm, 30 D), consisting of a plasticizing extruder with a nip roll, the compound is melted in the extruder at a mass temperature of 285° C. and the melt is extruded through the sheet die at a die temperature of 290° C. directly onto polypropylene spunbonded material (weight per unit area: 25 g/m$^2$) supplied at a maximum equipment speed of 110 m/min. After the melt has bonded to the nonwoven, the total composite, while it is being taken off, is cooled to a temperature range below the crystallization range of the polypropylene mixture, edge trimmed and rolled up.

Subsequently, the composite is stretched longitudinally at a stretching ratio of 1:2.0 and at temperatures ranging from 80° to 150° C. and transversely at a stretching ratio of 1:1.8 and at temperatures ranging from 100° to 165° C. The white crackling cloudiness becomes pronounced especially during the longitudinal stretching but also during the transverse stretching. The composite can be stretched at a speed not greater than 100 m/min.

After the stretching, the composite has a weight per unit area of 24 g/m$^2$.

EXAMPLE 3

3.1 Preparation of the Polypropylene Mixture

A mixture of 62.5 percent of a CR-PP polypropylene homopolymers, with a melt index of 25.8 g/10 minutes at 230° C./2.16 kg and an $M_w/M_N$ ratio of 2.8 and 37.5 percent to by weight of a compacted talcum with a particle diameter, measured over the longest extent of the particles, of 3 $\mu m$, is melted in a Werner & Pfleiderer ZSK 133 twin screw extruder, having a temperature profile of 150°/180°/200°/220°/250°/220°/220°/210° C., homogenized, discharged and granulated.

The resulting polypropylene compound has a melt index of 15.2 g/10 minutes at 230°/2.16 kg and a density of 1.15 g/cc.

3.2 Preparation of the Composite with a Textile Character

After it has been pre-dried for 4 hours at 150° C., the compound has a residual moisture content of 70 ppm.

On a coating installation of example 2, the compound is melted and the melt extruded through the sheet die at a die temperature of 290° C. directly on to polypropylene spunbonded material (weight or unit area: 25 g/m$^2$) that is supplied. A reliable coating production is possible up to and equipment speed of 65 m/min. Above a speed of 70 m/min, the draw variation occurring in the edge region and, in addition, micro-holes tear open a reliable and economic production at speeds >70 m/min is not possible.

During the subsequent stretching of the laminates, coated at 65 m/min, under the same conditions as in Example 2, irregularities in the stretching, and therefore different weights per unit area occur at take-off speeds greater than about 50 m/min.

EXAMPLE 4

4.1 Preparation of the Polyethylene Mixture

A mixture of 50 percent by weight of an LDPE homopolymer, prepared by the autoclave process and having a melt index of 15 g/10 minutes at 190° C./2.16 kg and 50 percent by weight of coated chalk, with a particle diameter, measured over the longest extent of the particles, of 2 $\mu m$ is melted in a ZSK 40 twin screw extruder with a temperature profile of 100°/150°/180°/200°/220°/200°/200°/190° C., homogenized, discharged and granulated.

The resulting polyethylene compound has a melt index of 9.8 g/10 minutes at 190° C./2.16 kg and a density of 1.35 g/cc.

4.2 Preparation of the Composite with a Textile Character

After it has been pre-dried for five hours at 70° C., the compound has a residual moisture content of 50 ppm.

On past coating equipment (diameter: 120, 33 D) consisting of a plasticizing extruder with a sheet die, the compound is melted in the extruder at a mass temperature of 210° C. and the melt is extruded through the sheet die at a die temperature of 200° C. directly onto supplied polyethylene spunbonded material (weight per unit area: 40 g/m$^2$) at an equipment speed of 250 m/min. After the melt has been bonded (coating weight approximately 12 g/m$^2$) by means of fixing it electrostatically to the nonwoven material, the total composite is cooled off, edge trimmed and rolled out.

Subsequently, the composite is stretched longitudinally at a stretching ratio of 1:2.5 and at temperatures ranging from 30° to 100° C. and transversely at a stretching ratio of 1:1.9 and at temperatures ranging from 80° to 125° C. The white crackling cloudiness becomes pronounced especially during the longitudinal stretching but also during the transverse stretching. The composite can be stretched at a speed of up to 220 m/min without any problems.

After the stretching the weight per unit area of the whole composite is 26 g/m², the weight of the extrusion coating being only about 6 g/m².

EXAMPLE 5 (COMPARISON EXAMPLE)

On standard cast film equipment, consisting of a plasticizing extruder with a sheet die, the polyethylene compound of example 4, which has been pre-dried under the same conditions, is mounted at a mass temperature of 230° C. and the melt is extruded through the sheet die at a die temperature of 220° C. directly onto the same polyethylene spunbonded material, listed in Example 4 (weight per unit area: 40 g/m²). The melt is fixed here by means of an air knife. An attempt was made to process a sheet with the same weight per unit area at the same high take-off speeds of Example 4.

However, it was possible to produce only one sheet with a maximum weight per unit area of 16 g/m² at a maximum speed of 150 m/min. Moreover, there was an irregular distribution of thicknesses or draw variations and inadequate adhesion. It was no longer possible to stabilize the sheet uniformly.

EXAMPLE 6 (COMPARISON EXAMPLE)

An attempt was made to process the polyethylene mixture of Example 4 under the conditions of Example 5 into a sheet with the same weight per unit area, disregarding the adjustment of the take-off speed.

At an equipment speed of 50 m/min, it was possible to achieve a relatively stable production of a sheet with a weight per unit area of 12 g/m². However, compared to the process data of Comparison Example 5, this represents an output reduction of about 80 percent. Such a production is absolutely uneconomic for the manufacture of hygiene sheets for the diaper area.

With these thin sheets, weighing 12 g/m², an attempt was made to laminate a polyethylene spunbonded material (40 g/m², corresponding to that of Example 4) by means of an adhesive. It was very difficult to unwind this extremely brittle sheet and to combine it with the polyethylene spunbonded material by means of an adhesive. Because of the high brittleness of the sheet, tears occurred continuously. Moreover, it was very difficult to guide such a thin sheet. Finally, at a maximum speed of 20 m/min, it was possible to produce a roll with only 1 tear.

Such a production is by no means reliable and is anti-the economic.

EXAMPLE 7 (COMPARISON EXAMPLE)

With the polyethylene mixture of Example 4, an attempt was made to produce a comparable blown film at the take-off speeds and the film weight of Example 6.

On blown film equipment (diameter: 90 mm, 30 D), the pre-dried polyethylene compound, used in Example 4, was processed at a mass temperature of 190° C. and a die temperature of 185° C. into a blown film at a blow-up ratio of 1:4 and a neck length of 1.5 D (die diameter 150, 0.8 mm gap). It was possible to obtain a film with a weight per unit area of, at most, 19 g/m² at a take-off rate of 130 m/min. Moreover, there were instabilities in the film bubble and the winding behavior was unsatisfactory.

An attempt was also made to produce a 12 g/m² film by means of this technology however, this was not possible because the film bubble constantly tore off.

What is claimed is:

1. Extrusion-coated nonwoven sheeting comprising:

a nonwoven sheeting layer comprising a polymer selected from the group consisting of polyethylene, polypropylene, polyethylene terephthalate and polyamide having a weight per unit area of 5 to 100 g/m², and an extrusion coating on the nonwoven sheeting layer having a weight per unit area of 5 to 70 g/m², a white crackling cloudiness of 0.1 to 5, a pore area distribution for at least 90 percent of all pores ranging in area from 0.03 to 0.20 $\mu m^2$, the maximum pore area being less than 1 $\mu m$, said extrusion coatings comprising:

a) ethylene homopolymers or copolymers of 70 to 99 percent by weight of ethylene and 30 to 1 percent by weight of α-olefins with 4 to 18 carbon atoms and/or vinyl acetate and/or aliphatic $C_1$ to $C_4$ alkyl (meth) acrylates with melt indexes of 0.1 to 100 g/10 minutes at 190° C./2.16 kg and/or b) propylene homopolymers or copolymers of 70 to 99 percent by weight of propylene and 30 to 1 percent by weight of ethylene and/or α-olefins with 4 to 18 carbon atoms, c) 1 to 50 percent by weight, based on the propylene polymers b), of modified propylene polymers with melt indexes of 0.1 to 50 g/10 minutes at 230° C./2.16 kg and a ratio of the intrinsic viscosity of the modified polypropylene to the intrinsic viscosity of the unmodified polypropylene with the same weight average molecular weight of 0.20 to 0.95, d) 10 to 60 percent by weight, based on the sum of the polymers a), b) and c), of organic and/or inorganic fillers with a particle diameter, measured over the major axis of the particles, of 0.1 to 10 $\mu m$, and e) 0.01 to 2.5 percent by weight of stabilizers, 0.01 to 1 percent by weight of processing aids, and 0.1 to 1 percent by weight of antistatic agents and/or 0.05 to 1 percent by weight of nucleating agents, in each case based on the sum of the polymers a), b) and c) wherein the extrusion-coated nonwoven sheeting is produced by a method comprising the steps of:

providing the nonwoven sheeting layer;

providing the extrusion coating, the residual moisture content of the extrusion coating being less than 600 ppm, in a melt at mass temperatures of 170° to 290° C. and at an equipment speed of 50 to 300 m/min, applying the extrusion coating;

subjecting the extrusion coated nonwoven sheeting at temperatures of 60° to 0° C. below the crystallization temperature of the extrusion coating to longitudinal stretching of 1:1.1 to 1:6 and;

subjecting the extrusion coated nonwoven sheeting at temperatures of 80° to 1° C. below the melting temperature of the extrusion coatings to a transverse stretching of 1:1.1 to 1:6, wherein the extrusion-coated nonwoven sheeting has a tensile strength of 4 to 20 MPa in the longitudinal direction and 2 to 15 MPa in the transverse direction and a total weight per unit area of 10 to 100 g/m².

2. The extrusion-coated nonwoven sheeting of claim 1, wherein the nonwoven sheeting layer further comprises polyamide and/or polyethylene terephthalate fibers and the extrusion coating is a co-extrusion coating comprising copolymers of ethylene and vinyl acetate and/or aliphatic $C_1$ to $C_4$ alkyl (meth)acrylates.

3. The extrusion-coated nonwoven sheeting of claim 1 or 2, wherein the polypropylene homopolymers or propylene copolymers of the extrusion coating further comprises 1) propylene polymers, propylene homopolymers and/or copolymers of propylene, ethylene and/or α-olefins with 4 to 18 carbon atoms, produced using Ziegler-Natta catalysts or metallocene catalysts and having a propylene content of 75.0 to 99.9 percent by weight in the form of random copolymers, block copolymers and/or random block copolymers with melt indexes of 0.1 to 300 g/10 minutes at 230° C./2.16 kg, and/or 2) a polyolefin mixture with an $M_w/M_n$ ratio of 2 to 6 and a melt index of 1 to 40 g/10 minutes at 230° C./2.16 kg, comprising 60 to 98 percent by weight of a crystalline copolymer of 85 to 99.5 percent by weight of propylene and 15 to 0.5 percent by weight of ethylene and/or an α-olefin of the formula $CH_2$=CHR, in which R is a linear or branched alkyl group with 2 to 8 carbon atoms, and 2 to 40 percent by weight of an elastic copolymer of 20 to 70 percent by weight of ethylene and 80 to 30 percent by weight of propylene and/or an α-olefin of the formula $CH_2$=CHR, in which R is a linear or branched alkyl group with 2 to 8 carbon atoms, and/or 3) largely amorphous polypropylenes and/or propylene copolymers, which contain less than 10 percent by weight of crystalline polypropylene or crystalline propylene copolymer, have an enthalpy of melting of less than 40 J/g and a melt index of 0.1 to 10 g/10 minutes at 230° C./2.16 kg, the largely amorphous polypropylene being a homopolymer of propylene and/or a copolymer of propylene of at least 80 mole percent of propylene and not more than 20 mole percent of one or more α-olefins of the formula $CH_2$=CHR, in which R is a linear or branched alkyl group with 2 to 8 carbon atoms, and/or 4) non-isotactic propylene homopolymers with a melting point of 145° to 165° C., a melt viscosity greater than 200,000 cps at 190° C., a heat of crystallization of 4 to 10 cal/g and a solubility of 35 percent to 55 percent by weight in diethyl ether.

4. The extrusion-coated nonwoven sheeting of claims 1 or 2, wherein the modified propylene polymers of the extrusion coating, are modified propylene homopolymers and/or modified propylene copolymers, which are produced by treatment of propylene homopolymers and/or copolymers of propylene and ethylene or α-olefins with 4 to 18 carbon atoms and mixtures thereof, said treatment being carried out in the presence of multifunctional, ethylenically unsaturated monomers and/or ionizing radiation or thermally decomposing free radical-forming agents.

5. The extrusion-coated nonwoven sheeting of claim 1, wherein the modified propylene polymers are produced by a method comprising the steps of:

1) providing polypropylene particles, as powders, granulates or grit having a particle size from 0.001 to 7 mm comprising 1.1) propylene homopolymers, and/or propylene homopolymers having a bimodal molecular weight distribution, a weight average molecular weight $M_w$ of 500,000 to 1,500,000 g/mole, a number average molecular weight $M_N$ of 25,000 to 100,000 g/mole and $M_w/M_n$ values of 5 to 60, which were synthesized in a reactor cascade using Ziegler-Natta catalysts or metallocene catalysts, and/or of 1.2) copolymers of propylene and ethylene or α-olefins with 4 to 18 carbon atoms, preferably random propylene copolymers, propylene block copolymers, random propylene block copolymers and/or elastomeric polypropylenes or of mixtures thereof, mixing said polypropylene particles in a continuous mixer with 0.05 to 3 percent by weight, based on the polypropylenes provided, of acyl peroxides, alkyl peroxides, hydroperoxides, peroxycarbonate and/or peresters as thermally decomposing free radical-forming agents said thermally decomposing free radical-forming agents being diluted with inert solvents, thermally decomposing the particles and the thermally decomposing free radical forming agents below 210° C., with heating to 30° to 100° C., 2) providing volatile, bifunctional monomers, particularly $C_4$ to $C_{10}$ dienes and/or $C_7$ to $C_{10}$ divinyl compounds, which are adsorbed by the polypropylene particles from the gas phase, in continuous flow mixers as continuous gas-solid adsorbers, at a temperature T of 20° C. to 120° C. and an average absorption time of 10 seconds to 1,000 seconds, a proportion of bifunctional, unsaturated monomers in the polypropylene particles being 0.01 to 10 percent by weight, based on the polypropylenes used, 3) forming a melt of the polypropylene particles, in which the acyl peroxides, alkyl peroxides, hydroperoxides, peroxycarbonates and peresters, as thermally decomposing free radical-forming agents, and the bifunctional, unsaturated monomers have been adsorbed, said melt being formed under an atmosphere of an inert gas and of these volatile bifunctional monomers at 110° to 210° C. in continuously operating kneaders or extruders, in twin screw extruders such that, at the same time, the thermally decomposing free radical-forming agents are decomposed, 4) heating the melt thereupon to 220° C. to 300° C., such that unreacted monomers and decomposition products are removed and 5) granulating the melt, and in which, before steps 1) and/or 5) and/or before or during step 3) and/or 4), 0.01 to 2.5 percent by weight of stabilizers, 0.1 to 1 percent by weight of antistatic agents, 0.05 to 1 percent by weight of nucleating agents and/or 0.01 to 5 percent by weight of processing aids, based on the polypropylene used, are added as further processing aids.

6. The extrusion-coated nonwoven sheeting of claims 1 or 2, wherein fillers having an average particle size of 0.5 to 2 μm are present.

7. The extrusion-coated nonwoven sheeting of claims 1 or 2, wherein calcium carbonates are present as inorganic fillers.

8. The extrusion-coated nonwoven sheeting of claims 1 or 2, wherein the residual moisture content of the extrusion coating immediately before the extrusion coating is applied to the nonwoven sheeting layer is less than 300 ppm.

9. The extrusion-coated nonwoven sheeting of claims 1 or 2, wherein the nonwoven sheeting layer is spunbonded.

10. Packaging for food, detergents and drugs, textiles and clothing, industrial protective clothing, sports and military clothing, interlinings and decorative covering nonwovens, hygiene products, baby diapers, incontinence products, panty inserts and sanitary napkins, operating room clothing, clothing to protect against infection, table and bed covers, construction products, breathable nonwovens and roof linings, vehicle products, equipment and machinery construction products, electrotechnology products, electronics products, packaging for transport, domestic appliances and office products comprising extrusion coated nonwoven sheeting of claims 1 or 2.

* * * * *